United States Patent [19]

Noone

[11] 4,042,066
[45] Aug. 16, 1977

[54] PORTABLE EMERGENCY FIRE FIGHTING AND RESCUE ELEVATOR

[76] Inventor: Martin J. Noone, 19 Hunting St., Cambridge, Mass. 02141

[21] Appl. No.: 645,823

[22] Filed: Dec. 31, 1975

[51] Int. Cl.² .............................................. B66B 9/00
[52] U.S. Cl. ...................................... 187/6; 187/1 R; 187/27; 254/142
[58] Field of Search ........................... 187/1 R, 2, 6-8, 187/11, 27; 182/142-144; 254/142, 151, 154, 155

[56] References Cited

U.S. PATENT DOCUMENTS

| | | | |
|---|---|---|---|
| 481,888 | 8/1892 | Bergeron et al. | 182/142 |
| 489,368 | 1/1893 | Bruce | 182/142 |
| 1,060,969 | 5/1913 | Boldizzoni | 187/6 |
| 3,584,838 | 6/1971 | Tampin | 254/142 |
| 3,671,015 | 6/1972 | Sullivan | 254/142 |
| 3,860,092 | 1/1975 | Holmes | 254/154 |
| 3,945,469 | 3/1976 | Dorcich | 187/6 |

FOREIGN PATENT DOCUMENTS

| | | | |
|---|---|---|---|
| 733,196 | 7/1955 | United Kingdom | 187/8 |
| 173,904 | 1/1922 | United Kingdom | 182/142 |

*Primary Examiner*—Evon C. Blunk
*Assistant Examiner*—Jeffrey V. Nase
*Attorney, Agent, or Firm*—Walter J. Kreske

[57] ABSTRACT

A portable emergency fire fighting rescue and evacuation elevator for high rise buildings having roofs previously equipped with inverted L shaped hook structures, the elevator being comprised of a portable self contained elevator prime mover structure and a portable passenger cab. The elevator prime mover structure is transportable by helicopter to the roof of the building where it is automatically fastened in place by the L shaped hook structures and pays out, from storage drums on the prime mover structure, elevator and electric prime mover cables over the side of the building for fastening to a passenger cab which has been transported by truck to the building. The passenger cab is two stories high with each story having a sliding door between two caterpillar structures, each comprised of an endless belt with suction cups carried on idler wheels for movement of the endless belt suction cups against the side of the building. The passenger cab has means for preventing combustion gas seepage into the cab and a moveable plank beneath each door to forcibly batter through window obstructions and form a walkway between the cab and the building.

15 Claims, 9 Drawing Figures

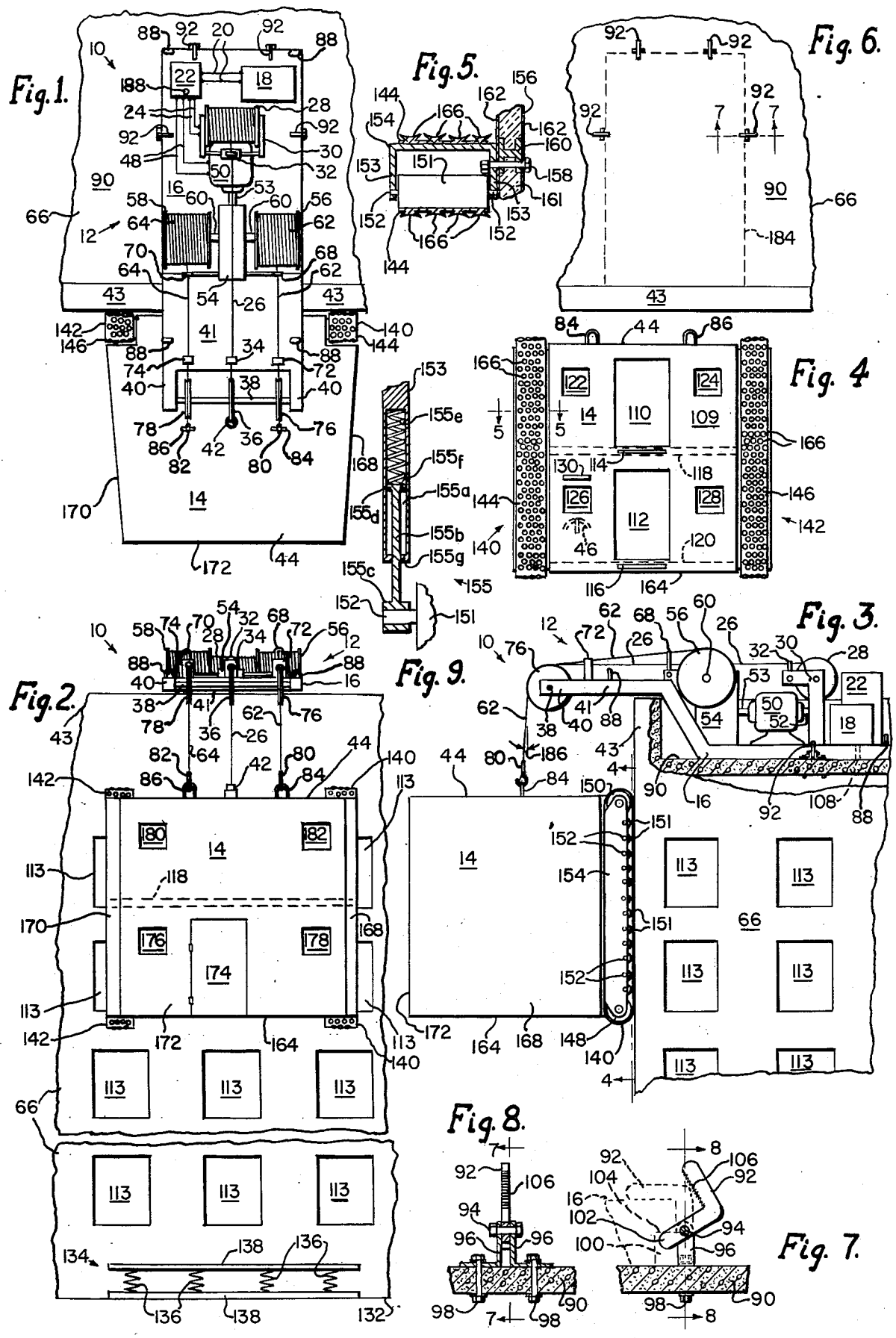

PORTABLE EMERGENCY FIRE FIGHTING AND RESCUE ELEVATOR

BACKGROUND OF THE INVENTION

1. Field of the Invention

Portable emergency fire fighting, rescue and evacuation elevator particularly suitable for high rise buildings of a height beyond the reach of conventional fire department apparatus.

2. Description of the Prior Art

A serious safety problem exists to occupants of today's sky scrapers and high rise apartment buildings, the upper floors of which cannot be reached by existing extension ladders of fire departments, as evidenced by newspaper articles of fire tragedies to people trapped in upper stories of such buildings. Attempts using elevator type structures have been made in the past to solve the problem of evacuating people from buildings under emergency conditions, but such solution attempts have been generally unsatisfactory particularly where substantial numbers of people must be evacuated quickly. For example, one such recent solution attempt is disclosed in U.S. Pat. No. 3,831,711. It provides for permanent emplacement of vertical tubular members on the outside walls of the building and adapted to carry one individual at a time on a small exposed platform moving vertically in a slot in the tubular member. Such evacuation structure is inadequate for modern high rise buildings for several reasons. One reason for its inadequacy is that its low rate of people evacuating capability makes it particularly inadequate under emergency conditions such as in rapidly spreading fires where substantial numbers of people must be evacuated quickly. Another undesirable characteristic of such evacuation structure is its requirement of permanent disfiguring emplacement of verticular tubular channel members on the outside walls of the building. Also a further undesirable characteristic of such structure is its requirement for precarious movement of persons to reach the personnel carrier of the device from an open window or even from the roof of the building.

Other earlier unsatisfactory attempts at solving the problem of emergency evacuation of people from buildings with elevator type structures are found in U.S. Pat. Nos. 121,796; 473,572 and 709,519. The U.S. Pat. No. 121,796 structure succeeds in avoiding the need for permanent exterior emplacements, but has the serious limitations of evacuating a single individual at a time as well as the usurpation of a substantial amount of valuable interior building space for the indefinitely long periods between evacuation emergencies. U.S. Pat. No. 473,572 similarly has the undesirable characteristic of requiring permanent vertical tubular members fixed to the outside walls of the building as well as limiting evacuation to a single individual at a time, resulting in too low a rate of evacuation for practical use in emergency conditions, and the undesirable requirement of a person's precarious movement from a window to reach the escape vehicle which is carried in a slot in the tubular member. While the structure disclosed in U.S. Pat. No. 709,519 provides a safer and more convenient arrangement for an individual to reach the evacuation vehicle from a window, it has the disadvantage of similarly requiring permanent disfiguring support and guide members at the outside walls of the building and an inherent structural character not suitable for high rise buildings.

SUMMARY OF THE INVENTION

The present invention constitutes a significant advance in the art in that the above undesirable characteristics of elevator type emergency evacuation structures have been overcome in Applicant's present invention which achieves an elevator type structure particularly suitable for not only rapid evacuation of large numbers of people from modern sky scrapers and high rise apartment buildings and provides a relatively easy and safe arrangement for movement of people from buildings through windows to the elevator passenger cab, but also provides a rapid and safe means for delivering large numbers of fire fighters with fire extinguishing equipment to the fire floor. Besides lending itself to such desirable rapid fire fighter access to the fire floor and safe evacuation of large numbers of people quickly, the passenger cab of the present invention is capable of passing over projections in its path on the outer wall of the building, such as cornices, protruding porches and bay windows, and provides protection from heat and high winds caused by the fire.

Also the present invention achieves an elevator type emergency evacuation structure which does not require valuable interior building space nor require replacement of permanent disfiguring structures on the outside walls of the building.

A primary object of the present invention is the provision of an elevator type emergency evacuation structure having capacity for rapid and safe evacuation of large numbers of people from high rise buildings under emergency evacuation conditions, while at the same time serving as a delivery vehicle for fire fighters and fire fighting equipment to the fire floor.

Another object of the present invention is the provision of an elevator type emergency evacuation structure which is portable and suitable for use on substantially all high rise buildings with only a requirement for simple fastening hooks on the roof of such building.

Another object is the provision of an elevator type emergency evacuation structure having a personnel carrier or cab with capacity for vertical ascent and descent along an outside wall of the building even over outwardly projecting members such as cornices, porches and bay windows and through flame and high temperature conditions.

These objects, features and advantages of the present inventions are achieved generally by the provision of an elevator prime mover structure on a suitable platform or base to form a unitary structure transportable by helicopter to the roof of a high rise building and having sufficient elevator cable to accomodate the height of the building, a separate elevator passenger cab transportable by truck to the building and having an arrangement for fastening the cab to the end of the elevator cable, and an endless belt caterpillar structure on each end of a wall of the passenger cab for engaging the side of the building as the cab is moved vertically on the end of the elevator cable.

The roof of the building will have been previously provided with relatively simple hook structures at selected positions at the respective sides of the building such that when the base or platform carrying the prime mover elements is lowered by helicopter onto the roof, the hooks automatically grasp and hold the prime mover structure in position wherein the elevator cable may be paid out over the associated side of the building. The passenger cab has a door in its wall between the caterpillar structures and positioned to align with the windows at respective story levels in the side of the building as the cab is moved vertically by the elevator cable.

By also providing the passenger cab with a moveable plank at the cab floor level, moveable to forcibly break through closed window obstructions to form a walkway between the building and the cab, a convenient and safe arrangement is thereby provided for properly equipped fire fighters in large numbers to go directly to the fire floor, as well as a safe arrangement for people trapped on a floor in the building serviced by the cab to rapidly move into the cab.

By making the passenger cab of a height covering two stories of the building in the form of upper and lower passenger compartments with a sliding door between the caterpillar structures in each of the compartments alignable with the windows of respective adjacent upper and lower stories of the building, both increased speed of evacuation and accomodation for increased numbers of people are thereby achieved.

By including in the prime mover arrangement a self contained motor generator structure such as the extremely light weight liquid propane motor generator model No. GTCP 85-184 of Air Research Corporation of Phoenix, Ariz., for providing the power for operation of the invention, increased versatility of the overall emergency evacuation elevator structure is thereby achieved.

By including an electric cable storage and paying out arrangement at the prime mover structure in synchronism with movement of the elevator cable, and provision for coupling the cable to a manually operated command signal structure in the passenger cab, a relatively simple and direct arrangement for transmission of command signals to the prime mover in conventional manner of elevators is thereby achieved as well as a power source for electric equipment in the passenger cab.

By making the endless belt caterpillar extend above and below the passenger cab, a structure for guiding the cab over not only the wall of the building, but also over outwardly projecting members such as cornices, porches and bay windows is thereby achieved.

By providing the caterpillar endless belt with cup shaped projections which tend to provide suction cup grip on the wall of the building, stabilization of the cab against drift from cross winds such as caused by a fire is thereby achieved.

DESCRIPTION OF THE DRAWINGS

The features of the invention which are believed to be novel are set forth with particularity in the appended claims. The invention together with the features, objects and advantages of the present invention will be better understood from the following description in conjunction with the accompanying drawings in which like reference numbers identify like components and in which:

FIG. 1 is a plan view showing a segmentary portion of a roof of a high rise building to which is attached a preferred embodiment of the invention including an elevator prime mover structure with its base attached by L shaped hook members to the roof and having elevator cables carrying an elevator passenger cab positioned for vertical movement along the side of the high rise building;

FIG. 2 is a front elevation of the segmentary portion of the high rise building of FIG. 1 and the visible portions of the FIG. 1 embodiment of the invention;

FIG. 3 is a side elevation of the FIG. 1 high rise building partially cutaway to make visible a side elevation of the FIG. 1 embodiment to more clearly show construction;

FIG. 4 is a view taken on line 4—4 of FIG. 3 to more clearly show construction of the portion of the passenger cab facing the wall of the high rise building;

FIG. 5 is a cross sectional view to enlarged scale taken on line 5—5 of FIG. 4 to more clearly shown construction of the caterpillar portion of the passenger cab;

FIG. 6 is a plan view of the segmentary portion of the high rise building roof of FIG. 1 showing a set of four hook members in reclined or open position ready for receiving and automatically locking onto the elevator prime mover base;

FIG. 7 is a side elevation to enlarged scale taken on line 7—7 of FIG. 6 to more clearly show construction of the L shaped hook member mounted to a bracket fixed to the roof of the high rise building;

FIG. 8 is a view taken on line 8—8 of FIG. 7 to more clearly show construction of the L shaped hook member and bracket;

FIG. 9 is a cross sectional view to further enlarged scale of a suitable shock absorber structure incorporated in the FIG. 5 illustrated arrangement.

DESCRIPTION OF THE ILLUSTRATED EMBODIMENT

Referring to the drawings in more detail, a portable emergency fire fighting, rescue and evacuation elevator in accordance with the present invention is designated generally by the numeral 10 in FIGS. 1, 2 and 3. The portable emergency rescue and evacuation elevator 10 is comprised of two separately portable assemblies, an elevator prime mover structure 12 and an elevator passenger cab 14. The elevator prime mover structure 12 has a base or platform 16 on which are mounted elevator prime mover components shown partially schematically and partially in block diagrammatic form and include a self contained motor generator 18 such as model No. GTCP 85-184 of Air Research Corporation, Phoenix, Ariz., and weighing only 180 pounds. The self contained motor generator 18 incorporates a supply of liquid propane on which it operates and is coupled by electric cables 20 to a conventional electrical control unit 22 for elevator mechanisms. The electrical control unit 22 is responsive to command signals received through electric signal cables 24 coupling the control unit 22 to the plural strand electric signal cable 26 carried on an electric cable storage drum 28 operatively mounted on an electric cable drive mechanism 30 which includes a level wind guide mechanism 32. The electric signal cable 26 passes through another electric signal cable guide 34 over a guide pulley 36 mounted to rotate on a shaft 38 carried by projecting arms 40 at the forward portion 41 of the base 16 over a conventional parapet 43 of a high rise building 66. The plural strand electric cable 26 passing over the pulley 36 is coupled by a suitable electrical connector 42 at the top 44 of the passenger cab 14 and through which it is coupled by further electric cable (not shown) to a conventional manually operable elevator control 46 inside the passenger compartment of the elevator cab 14 shown by broken lines in FIG. 4 and by means of which command signals are conveyed to the electrical control unit 22 for causing the electric cable drive mechanism 30 to selectively pay out, wind in, or hold stationary in stop position the electric cable 26 as will be further hereinafter described.

The electrical control unit 22 is also coupled by electric power cables 48 (FIG. 1) to an electric motor 50 fastened to the base 16 and having one side coupled by an output drive shaft 52 to the electric cable drive mechanism 30. The motor 50 also has on its other side an output drive shaft 53 coupled to an elevator cable drive mechanism 54 carrying two elevator cable storage drums 56 and 58 rotatable by a common drive shaft 60. Each of the elevator cable storage drums 56 and 58 carries stored thereon a sufficient length of elevator cable 62 and 64 respectively to accomodate the height of the high rise building 66, a segmentary portion of which is shown in FIGS. 1, 2 and 3. The elevator cables 62 and 64 pass through level wind guides 68 and 70 respectively operatively mounted to the elevator cable drive mechanism 54 for level winding of cables 62 and 64 onto the storage drums 56 and 58 respectively. The elevator cables 62 and 64 also pass through stationary elevator cable guides 72 and 74 and over elevator cable pulleys 76 and 78 respectively mounted to rotate on the shaft 38 and are fastened by safety catch hooks 80 and 82 to U shaped bolts 84 and 86 at the top 44 of the passenger cab 14.

Also, four U shaped bolts 88 are provided at the edges of the base 16 for receiving conventional lift rods or lift cables (not shown) whereby the elevator prime mover structure 12 may be lifted by helicopter from a central station and placed on a roof 90 of the high rise building 66 where L shaped hooks 92 are secured by pivot bolts 94 (FIGS. 7 and 8) to bracket members 96 fastened by bolts 98 to the roof 90 of the high rise building 66. The base 16 at each of the L shaped hook members 92 has a recess 100 as shown by broken lines in FIG. 7 to provide clearance for a leg extension 102 with the recess 100 ending at a position 104 such that when the bottom of the base 16 touches the top of the roof 90 the surface 104 of the base 16 by contact with the leg extension 102 causes the L shaped hook 92 to swing into the locking position shown by broken lines in FIG. 7 with the sawtooth surface 106 gripping the top surface of the base 16 so as to hold the base 16 and thereby the entire elevator prime mover 12 firmly in place for subsequent operation of the prime mover 12 as will be hereinafter further described.

The elevator prime mover structure 12 also has a pushbutton type switch shown by broken lines 108 in FIG. 3 beneath the electrical control 22 to which it is coupled such that when the base 16 touches the top surface of the roof 90 it causes a command signal from the switch 108 to the electrical control 22 wherein the motor 50 is energized in manner to cause a payout of the elevator cables 62, 64 and the electric cable 26 over the side of the building 66 all the way to ground level to where the elevator cab 14 has been transported by truck and where the safety hooks 80 and 82 are hooked onto the U shaped bolts 84 and 86 respectively, and the electric cable 26 is coupled to the electrical connector 42 thereby making the elevator emergency rescue and evacuation elevator 10 operable from inside the passenger cab 14 by manual control 46.

The passenger cab 14 is preferably two stories high and in its wall 109 (FIG. 4) which faces the building 66 are an upper and lower sidewardly sliding doors 110 and 112 respectively which are alignable with respective upper and lower windows in the side of the building 66 which conventionally carries rows of windows such as 113 on each story of the building 66. Beneath each of the sliding doors 110 and 112 is an outwardly moveable plank 114 and 116 respectively in the respective floors 118 and 120 shown by broken lines in FIG. 4 forming the respective upper and lower passenger compartments of the passenger cab 14. The moveable planks 114 and 116 may be moveable in the plane of the respective floors 118 and 120 outwardly from the wall 109 by conventional power means such as an electric motor or hydraulic plunger (not shown) whereby the planks 114 and 116 may be forceably moved against the associated building window obstruction 112 as a battering ram to remove such obstruction if necessary and thereafter each plank 114 and 116 may become a convenient and safe walkway for people escaping from the building 16 to the passenger cab 14, or for fire fighters to reach the fire floor.

On respective sides of the sliding door 110 and 112 are windows 122, 124 and 126, 128 respectively. Above the window 126 is a conventional periscope type mirror arrangement 130 permitting the operator at the electric control 46 to continually keep in view obstructions beneath the elevator cab 14 including ground level 132 where a portable cushioning pad 134 having springs 136 between two flat platform members has been placed to cushion the stop of the passenger cab 14 at ground level in the event of miscalculation by the elevator operator.

Also at the outside edges of the wall 108 are a pair of caterpillar structures 140 and 142, each having an endless belt 144 and 146 respectively carried over two cylindrical end wheels such as 148 and 150 (FIG. 3) and a plurality of smaller cylindrical support wheels mounted to rotate on axles such as the wheels 151 on axles 152 carried in the sides 153 of a U shaped support 154. For reducing jolts in the cab 14 from movement over projections and rough surfaces in the path of the passenger cab 14, the sides 153 of the U shaped supports 154 preferably incorporate a shock absorber structure 155 such as shown in FIG. 9 for each of the wheels 148, 150 and 151. The endless belts 144 and 146 of the caterpillar structures 148 and 150 also serve the important function of distributing the load of the cab 14 against the side of the building 66 to thereby prevent injury to even relatively weak structures such as window panes and glass siding from the heavy load conditions of the cab 14. In FIG. 9 a hollow bore 155a in the side 153 carries a longitudinally moveable shaft 155b having at one end a hub 155c carrying one end of the associated wheel axle 152. The other end of the shaft 155b has a laterally disposed flange 155d in sliding engagement with the internal wall of the hollow bore 155a. A compression spring 155e in the hollow bore 155a provides a longitudinal cushioning thrust against the flange 155d. The flange 155d has an orifice 155f for controlling, on longitudinal movement of the shaft 155b, flow of a hydraulic fluid in the bore 155a to thereby provide damping of movement of the shaft 155a caused by movement of the associated wheel and compression spring. An inwardly projecting flange 155g provides a close fit about the shaft 155b which permits the shaft 155b to slide therein without leakage of the hydraulic fluid in the bore 155a.

The U shaped support 154 is fastened to a side wall 156 of the passenger cab 14 by bolts such as bolt 158 preferably in a position through a structural metal I beam 160 forming part of the framework of the passenger cab 14. The wall 156 is similar to other walls of the passenger cab 14 and has insulating material 161 such as 6 inches thick of fire brick between stainless steel sheets 162 to thereby provide protection to occupants from high exterior temperatures which may sometimes be encountered from burning buildings.

The caterpillar structures 140 and 142 extend above the top wall 44 and below the bottom wall 164 of the passenger cab 14 to make first encounter with and carry the passenger cab 14 over projections such as bay windows, porches and cornices (not shown) on the wall of the building 66 and which may be in the path of the passenger cab 14. The endless belts 144 and 146 also preferably have cup shaped projections such as 166 (FIGS. 4 and 5) which tend to provide suction cup grip on the wall of building 66 and stabilize lateral movement of the passenger cab 14 even in the face of cross winds such as are sometimes created by fires in buildings. The cup shaped projections 166 also provide a cushioning effect againt the building 66 which assists in preventing injury to fragile portions of the building 66. To minimize sideward sway from cross wind forces on the passenger cab 14, the sides 168 and 170 are at an obtuse angle with respect to the wall of the building 66. Thus the back wall 172 of the passenger cab 14 is narrower than the width of the cab 14 adjacent the building 66.

The back wall 172 also has an exit door 172 in the lower passenger compartment. On each side of the door 174 are observation windows 176 and 178. The upper passenger compartment also has windows 180 and 182 respectively. A ladder (not shown) rather than stairs may be provided for passenger movement from the upper to the lower passenger compartment to maximize passenger space. Also to insure that the passenger cab 14 will at all times be stabilized against the wall of the building 66, the placement of the prime mover structure 12 is arranged by markings 184 (FIG. 6) on the roof 90 of the building 66 and placement of the L shaped hook members 92 such that the elevator cables 62 and 64 over pulleys 76 and 78 respectively will be at a small angle 186 (FIG. 3) with respect to vertical. While FIG. 6 shows a suitable placement of one set of four hook members 92, the building 66 will preferably have four sets, one set at each side of the building 66.

The plural strand electric cable 26 carries sufficient electric power from the motor generator 18 to also supply electrical energy needed not only for the moveable planks 114 and 116 and control 46, but also for appropriate internal and external lighting fixtures, speaker system and medical and resuscitation equipment carried in the passenger cab 14 but not shown in the drawings.

In the operation of the emergency fire fighting, rescue and evacuation elevator 10, portable elevator prime motor structure 12 and portable elevator passenger cab 14 together with the passenger cab cushioning pad 134 are normally stored at a central fire station which may service a substantial geographic high rise building area. The high rise buildings to be serviced have installed at desired positions on the roofs thereof L shaped hooks 92 fastened to the roof by brackets as shown in FIGS. 7 and 8 and preferably also with visible markings 184 as shown in FIG. 6.

When an emergency in any of such high rise buildings occurs requiring evacuation of trapped personnel or the services of fire fighters and fire fighting equipment, the elevator prime mover structure 12 is immediately flown by helicopter to the high rise building 66 and lowered into position at the desired markings 184 thereby becoming automatically locked in place by the L shaped hooks 92 as described above. Such placement causes the switch 108 to effect the energizing of motor 50 through electrical control 22 causing elevator drive 54 to rotate elevator cable storage drums 56 and 58 to pay out elevator cables 62 and 64 over the side of the building 66. Similarly a payout of electric cable 26 from storage drum 28 will occur in synchronism with the elevator cables 62 and 64 until they reach the passenger cab 14 at ground level 132 where the passenger cab 14 has been delivered by truck. Thereupon the elevator cables 62 and 64 are fastened by safety hooks 80 and 82 to the U shaped bolts 84 and 86 respectively on the top 44 of the cab 14, and the plural strand electric cable 26 is coupled by connector 42 to the passenger cab 14 whereupon an elevator operator may take over control and operation of the emergency fire fighting, rescue and evacuation elevator 10 by means of the elevator control 46. Such elevator operator may then move the passenger cab 14 vertically with properly equipped fire fighters therein at will by manual operation of the control 46 to any desired height of the building 66 and may use the moveable planks 114 and 116 to gain entrance through windows for the fire fighters access to the fire, as well as for evacuation of people trapped in the building 66.

The cab 14 may be sufficiently large for accomodating 100 people in the combined upper and lower passenger compartments for rescue in each pass of the cab 14 to ground level 132. The cushioning pad 134 which has been transported to the site by truck and placed in position for cushioning the ground level stop of the cab 14 is a precautionary safety device in the event of miscalculation by the elevator operator. Also cylinders of compressed air carried in the cab 14 may be used to maintain an internal cab pressure slightly higher than that outside the cab 14 to thereby prevent seepage of smoke and other combustion gasses into the cab 14 in the event of malfunction of seals about windows and doors.

When the emergency evacuation has been carried out and the fire or other emergency has ceased and it is desired to remove the emergency fire fighting, rescue and evacuation elevator 10, the cab 14 is lowered to ground level where the safety hooks 82 and 84 are manually unlatched from the U shaped bolts 84 and 86 and the electrical cable 26 is manually uncoupled from the electrical connector 42. The passenger cab 14 is thereby free to be loaded onto a truck in conventional manner and transported back to the central fire station storage location as is also the cushioning pad 134.

To free the elevator prime mover structure 12, an individual may be transported by helicopter to the roof 90 where the L shaped hooks 92 are unfastened from the prime mover base 16 by manually removing the pivot bolts 94. Also by means of a switch 188 on electric control 22 the elevator cables 62 and 64 and electric cable 26 are wound onto the storage drums 56, 58 and 28 respectively. Thereafter conventional lifting cables or rods may be inserted in the U shaped bolts 88 and coupled to the helicopter and the prime mover 12 transported by helicopter back to the central fire station storage location. After the removal of the prime mover 12, the L shaped hooks 92 are manually reinstalled with the pivot bolts 94 and left in the open position shown in FIGS. 6, 7 and 8 for automatic locking use as explained above at any desired future time.

This invention is not limited to the specific details of construction and operation described as equivalents will suggest themselves to those skilled in the art. For example, the use of conventional electronic remote control signal means and batteries to power components in the cab 14 instead of the switches 108 and 188 and the direct cable 26 and manual control 46 is within the spirit and contemplation of the present invention.

What is claimed is:

1. In a portable emergency rescue and evacuation elevator suitable for a high rise building the combination of:
    a. portable elevator prime mover means including elevator cable storage means with sufficient elevator cable to accomodate the height of the building; self contained motor power means operatively coupled to said elevator cable storage means for selectively holding in fixed stop position, for paying out, and winding in said elevator cable; and a base to which said elevator cable storage means and self contained motor power means are mounted to form a portable unitary structure transportable by helicopter to the roof of said high rise building and for positioning to pay out said elevator cable over the side of said building; and
    b. a portable elevator passenger cab transportable by truck to said building, said passenger cab having a wall between two caterpillar means each having an endless belt carried on a plurality of support wheels, fastening means for suspending said passenger cab on said elevator cable in position with the endless belts of said caterpillar means touching the side of said building, and a door in said passenger cab wall between the two caterpillar means facing and alignable with windows at respective storey levels of said building side as said cab is moved vertically by said elevator cable on said building side in response to motor power from said prime mover means on said roof.

2. The combination as in claim 1 wherein said passenger cab has a plank means with a moveable plank member at cab floor level beneath said door and moveable in the plane of said floor and outwardly from said cab wall to forcibly break through closed window obstructions and to form a walkway between the building and the passenger cab.

3. The combination as in claim 1 wherein said passenger cab has a height covering two stories of said building to form an upper and lower passenger compartments with a door between the two caterpillar means in each of said compartments and alignable with the windows of respective adjacent upper and lower stories of said building.

4. The combination as in claim 3 wherein said upper and lower passenger compartments each has a plank means with a moveable plank member at the floor level of the respective compartment, each plank member being moveable in the plane of the respective floor and outwardly from said cab wall to forcibly break through closed window obstructions at the respective building stories and to form a walkway between the building and the respective passenger compartment.

5. The combination as in claim 1 wherein said motor power means includes electric control means responsive to command signals for effecting said selective elevator cable paying out, winding in and holding in fixed stop postion.

6. The combination as in claim 5 wherein said passenger cab includes means for selectively providing said command signals, and means for transmitting said command signals to said control means.

7. The combination as in claim 6 wherein the signal transmission means includes an electric cable coupled to said means for selectively providing said command signals in said passenger cab and said control means; and the primer mover means includes a means for storing, paying out, winding in and holding said electric cable stationary in stop position in synchronism with the elevator cable.

8. The combination as in claim 1 wherein the endless belts on support wheels of said caterpillar means extend a distance above said passenger cab and a distance below said passenger cab such that said caterpillar means will guide the passenger cab over outwardly projecting members as cornices, porches and bay windows on said building side in the path of said passenger cab.

9. The combination as in claim 1 wherein said passenger cab has side walls and a top and bottom walls insulated with fire brick for protection of passengers from fire heat and flames.

10. The combination as in claim 1 including fastening means on the roof of said high rise building responsive to placement of said prime mover means in cooperative relation to said fastening means for automatically fastening said portable unitary structure firmly in place on said roof in position to pay out said elevator cable over the side of said building.

11. The combination as in claim 10 wherein said fastening means includes a plurality of L shaped hook members fastened to said roof in position to pivot into holding engagement with the base of said unitary structure in response to said placement of said prime mover means in cooperative relation to said fastening means.

12. The combination as in claim 11 wherein said base has two ends and two sides and there are two of said hook members positioned for said engagement of said base at one of said base ends, and one of said hook members positioned for said engagement of said base at each of said base sides.

13. The combination as in claim 12 wherein each of said L shaped hook members is pivotally carried on a pivot pin fixed to brackets fastened to the roof of said building in position such that when said base is lowered into said position on said roof said hook members are cause to automatically swing into fastening engagement with said base.

14. In a portable emergency rescue and evacuation elevator suitable for a high rise building the combination of:
    a. elevator prime mover means including elevator cable storage means with sufficient elevator cable to accomodate the height of the building; self contained motor power means operatively coupled to said elevator cable storage means for selectively holding in fixed stop position, for paying out, and winding in said elevator cable; and a base to which said elevator cable storage means and self contained motor power means are mounted to form a portable unitary structure transportable by helicopter to the roof of said high rise building and for positioning to pay out said elevator cable over the side of said building; and
    b. a portable elevator passenger cab transportable by truck to said building, said passenger cab having a wall between two caterpillar means each having an endless belt carried on a plurality of support wheels, fastening means for suspending said passenger cab on said elevator cable in position with the endless belts of said caterpillar means touching the side of said building, each of said endless belts includes cup shaped members thereon tending to provide vacuum cup engagement with said building side, said endless belts on said support wheels also extend a distance above said passenger cab and a distance below said passenger cab such that said caterpillar means will guide the passenger cab over outwardly projecting members as cornices, porches and bay windows on said building side in the path of said passenger cab, and a door in said passenger cab wall between the two caterpillar means facing and alignable with windows at respective storey levels of said building side as said cab is moved vertically by said elevator cable on said building side in response to motor power from said prime mover means on said roof.

15. The combination as in claim 14 wherein said passenger cab has two side walls and a back wall in addition to said wall between the caterpillar means, and said passenger cab has a smaller width as said back wall than at said caterpillar structures so that the side walls make obtuse angles with said building side to reduce cross wind force effects on said passenger cab.

* * * * *